(12) United States Patent
Pimenov et al.

(10) Patent No.: US 6,387,260 B1
(45) Date of Patent: May 14, 2002

(54) FILTRATION DEVICE FOR LIQUID PURIFICATION

(75) Inventors: Alexander V. Pimenov; Gleb Rusinov, both of St. Petersburg (RU); Joseph L. Shmidt, New York, NY (US); Alexander I. Lieberman, St. Petersburg (RU)

(73) Assignee: Electrophor, Inc., Dobbs Ferry, NY (US)

( * ) Notice: Subject to any disclaimer, the term of this patent is extended or adjusted under 35 U.S.C. 154(b) by 0 days.

(21) Appl. No.: 09/485,855
(22) PCT Filed: Aug. 20, 1998
(86) PCT No.: PCT/US98/17613
§ 371 Date: Feb. 17, 2000
§ 102(e) Date: Feb. 17, 2000
(87) PCT Pub. No.: WO99/08768
PCT Pub. Date: Feb. 25, 1999

(30) Foreign Application Priority Data

Aug. 21, 1997 (RU) .......................................... 97114629

(51) Int. Cl.⁷ ............................... C02F 1/28; C02F 1/42
(52) U.S. Cl. ......................................... 210/282; 210/288
(58) Field of Search ................................. 210/681, 694, 210/807, 282, 288, 290, 406, 416.3, 502.1, 503, 505

(56) References Cited

U.S. PATENT DOCUMENTS

| | | | |
|---|---|---|---|
| 4,066,551 A | 1/1978 | Stern | 210/282 |
| 4,301,009 A | 11/1981 | Cook et al. | 210/288 |
| 4,759,857 A | * 7/1988 | Acuna | 210/776 |
| 4,814,078 A | 3/1989 | Stern et al. | 210/282 |
| 4,969,996 A | 11/1990 | Hankammer | 210/476 |
| 5,536,394 A | 7/1996 | Lund et al. | 210/87 |
| 5,705,269 A | 1/1998 | Pimenov et al. | 428/375 |
| 5,904,854 A | 5/1999 | Shmidt et al. | 210/694 |

* cited by examiner

Primary Examiner—Ivars Cintins
(74) Attorney, Agent, or Firm—Ronald S. Cornell

(57) ABSTRACT

The invention is directed to purification of liquids, such as drinking water using filters, wherein filtration is effected while the liquid flows upwardly. The invention includes both the method and a device enabling the method to be carried out. The device is constructed to intake impure liquid at the bottom of the filter and initially to effect flow by filling liquid to above the filter outlet near the top, and maintaining flow thereafter by virtue of the presence of a low internal pressure that develops as the liquid passes through the system.

5 Claims, 8 Drawing Sheets

FILTRATION DEVICE FOR LIQUID PURIFICATION

FIELD OF THE INVENTION

The present invention relates to the purification of liquids such as water; and, more particularly, to improved purification devices wherein liquid flow is initiated by gravity through a filter containing an adsorption-bactericidal material, and the flow continues without using any additional sources of external pressure. Use of the improved device causes a flow pattern of liquid passing therethrough of such nature that the adsorption and bactericidal purification is enhanced and the quality of the purified liquid is thereby significantly higher than heretofore available.

BACKGROUND OF THE INVENTION

As medical and ecological information has increasingly shown that water pollution leads to illnesses, and as pollution of natural water resources, caused at least in part by population growth, has also increased, it has become obvious that it is necessary to use purified drinking water. The public clearly demands that the quality of its drinking water must be improved to ever greater levels. The need to filter water at home; and, particularly, the desirability of using point-of-use water filtration systems has become evident.

Typical point-of-use water filtration systems comprise a vessel that contains the liquid to be filtered. A cartridge filter is secured at the bottom of the vessel. Water flows into the top of the filter, passes downward by gravity through the filter cartridge where the water is purified. Purified liquid passes out through the bottom of the filter cartridge and is collected in another vessel which is located below the first vessel. Most commonly, the filter material comprises granular activated carbon, which removes chlorine, organics and other impurities.

In order to provide effective filtration employing such devices it is necessary, on one hand, to provide liquid flow through the filter with a minimum resistance, and, on the other hand, to provide required liquid residence time which is necessary for the adsorption of the dissolved impurities from liquid. Currently used filters employing granular adsorbents do not completely provide adequate resistance against the liquid flow.

To retain the adsorbent particles inside a filter cartridge, an additional filter element with small pores is often placed at the exit end of the prior art filter cartridge. This filter element often becomes plugged by small dust particles that move downward together with the liquid as it passes through the granular adsorbent. Plugging of the end filter significantly reduces the filtration capacity of the filter. Another problem is the visual control of the work of the filter, and controlling the quantity of the liquid that is being filtered.

Shown in U.S. Pat. No. 5,536,394 is a device for drinking water purification, comprising a housing, which has at least one opening for passing liquid into a chamber which is formed by the internal volume of the housing and a water treating cartridge, which includes a mechanism indicating the length of service of the water treating cartridge. This mechanism comprises a float that makes turns as a result of a cyclical use of the water filter. Said mechanism indicates the end of the service life of the water treating mechanism. After the float makes a specified number of turns, it stops in a position where it is visible through an opening in the housing.

Prior art filters are subject to another problem. For practical purposes, known constructions provide for liquid flow downwardly under gravitational forces with the liquid entering the filter element through the top part, and the purified liquid removed from the bottom part of the filter element. In such configurations, gas and air bubbles form inside the filtration material. These bubbles block pores, making liquid flow through the filter more difficult. Sometimes, they can even block liquid flow through the filter completely. To solve this problem there are designed special gas-catching constructions in the filter. This makes the filters more complicated and expensive, and limits the possible scope of their use.

Another significant drawback of known filter designs, wherein filtration takes place by the downward flow caused by gravity, is a complete drying out of the filter after the end of the filtration process. This limits the selection of ion-exchange materials that can be employed as filtration and adsorption agents, because many can not stand up to the periodically changing drying and wetting conditions, and they cease to perform properly.

One prior art filtration device similar in some respects to that of the present invention is a water filtration device that is described in U.S. Pat. No. 4,969,996. It comprises a conical container for the liquid to be purified, a separate container for the purified liquid, which is snugly fit to the conical container, and a removable filtration element that has nearly cylindrical walls, a top part and a bottom part. The filtration element contains a purification agent of the granular type therein. In order to avoid gases and/or air that are collected from becoming a barrier to the flow of liquid through the bottom part, a gas collecting fixture is provided in the form of a gas collecting cavity and gas collecting channels along the side walls of the filter element. Construction of such a filter element is difficult. Furthermore, filtration takes place by the "channeling flow," wherein liquid is being filtered through the filtration material non-uniformly along the separate channels. As a result some of the liquid that is being filtered moves through the filter faster than required for effective purification.

Known filters wherein filtration takes place in the downward direction either require using pressure from the water tap line (which limits where the filter can be used), or require hydrostatic pressure of an additional column of liquid (which does not purify the entire liquid volume, due to loss of pressure from the additional column of liquid), or require using additional complicated fixtures and constructions for effecting filtration.

There are technical problems, of the nature of those set forth above, that have not been solved until the present invention and which restrain the potential growth of use of liquid purification devices. Attempts to solve these problems in the known designs have led either to more complicated and expensive constructions or to the incomplete purification of at least a part of the liquid that is being filtered.

OBJECTS OF THE INVENTION

The objects of this invention are to improve the quality of liquid purification by providing a device which prevents premature plugging up of the pores of the filtration material, achieves better quality filtration and adsorption of the impurities, eliminates channeling, removes air and gasses, and maintains the filter element fully filled with liquid.

A primary object of this invention is to improve the quality of liquid filtration by providing a method that entails upward flow of the liquid during filtration.

Still another object is to enable quality liquid purification by providing liquid filtration by liquid flow in the upward direction using natural gravitational forces while, at the same time, the construction of the filter is simplified and made less expensive. Also, filtration in the filter is organized in such a way that while liquid is flowing by itself in the upward direction, the level where the purified liquid is being removed from the filter can be higher than the level at which liquid is being introduced into the filtration cartridge.

An additional object of this invention is to provide an automatic air and/or gas removal from the filtration material to improve purification and to have the filter cartridge fully filled with liquid after the end of the filtration, thereby prolonging usage of the filtration material.

A further object of the invention is to create a filter and filter cartridge which make it possible to have the filter design significantly simpler, cheaper and easier to manufacture, and which improves quality of filtration and lengthens the usage of the filtration material while, at the same time, reduces the filter resistance and improves purification ability as compared to the known filters for liquid filtration.

SUMMARY OF THE INVENTION

The objects of the invention are achieved by providing a device for liquid purification comprising in combination a container for liquid and a filter cartridge positioned inside the container and at its bottom. The filter cartridge comprises a housing with a filtration chamber therein and a sealed cavity in the upper portion thereof. A liquid inlet is at the bottom of the housing to permit liquid to flow from the container into the filter cartridge, upwardly through the filtration chamber, into a sealed cavity, and downwardly out of the filter cartridge through a fluid conduit of restricted cross sectional area the exit end of which is elongated to extend below the liquid inlet in the bottom of the filter cartridge. A vacuum is created in the sealed cavity which causes a siphon effect that draws additional liquid through the filter cartridge.

BRIEF DESCRIPTION OF THE DRAWINGS

The invention is explained with reference to the drawings in which.

DETAILED DESCRIPTION OF THE INVENTION

The essence of the invention is explained in the following description of the invention with reference to FIGS. 1–8.

Figure 1:
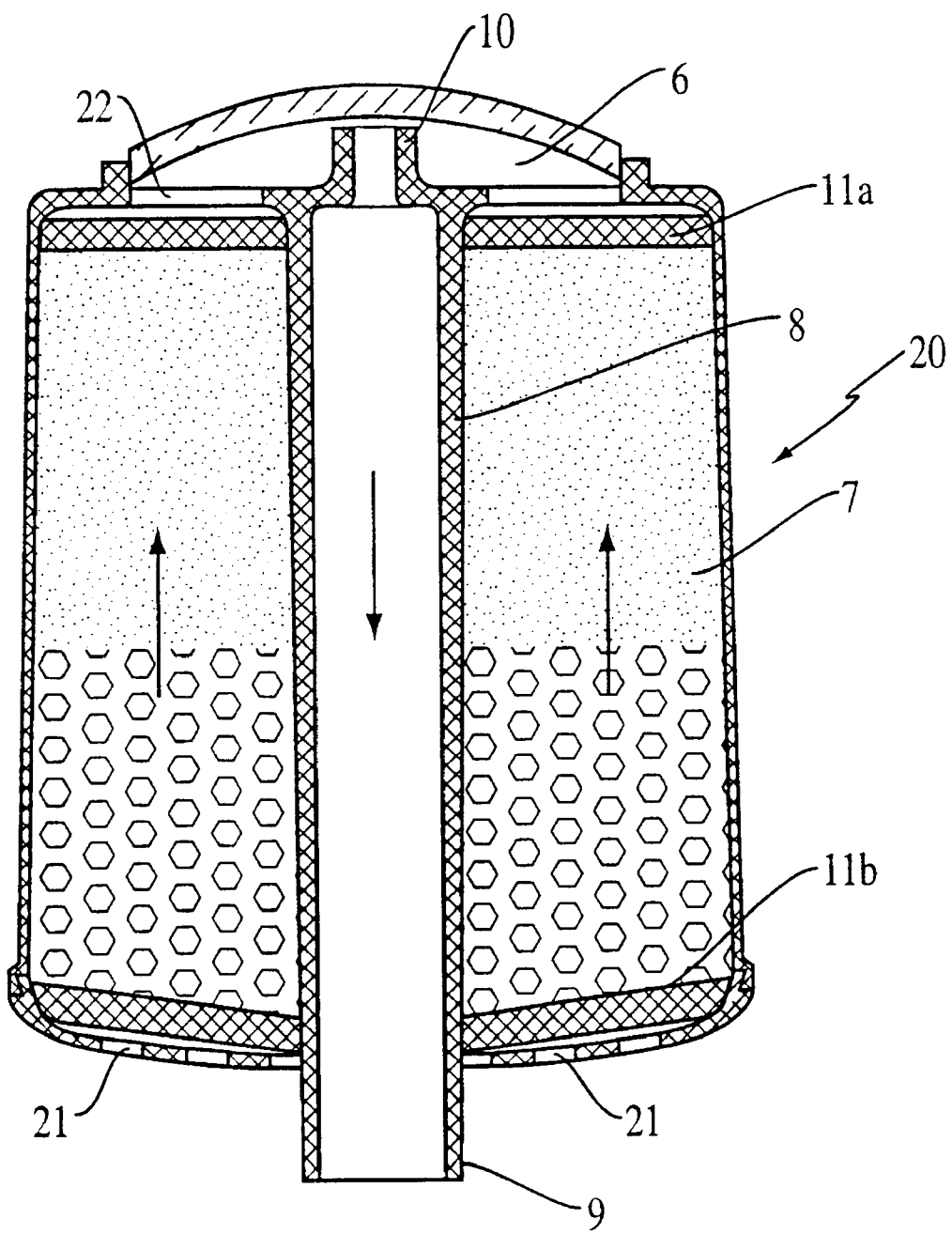
FIGS. 1 and 2 are cross sectional views of embodiments of a filter cartridge wherein the discharge conduit is located inside the housing of the filter cartridge.
Figure 3:
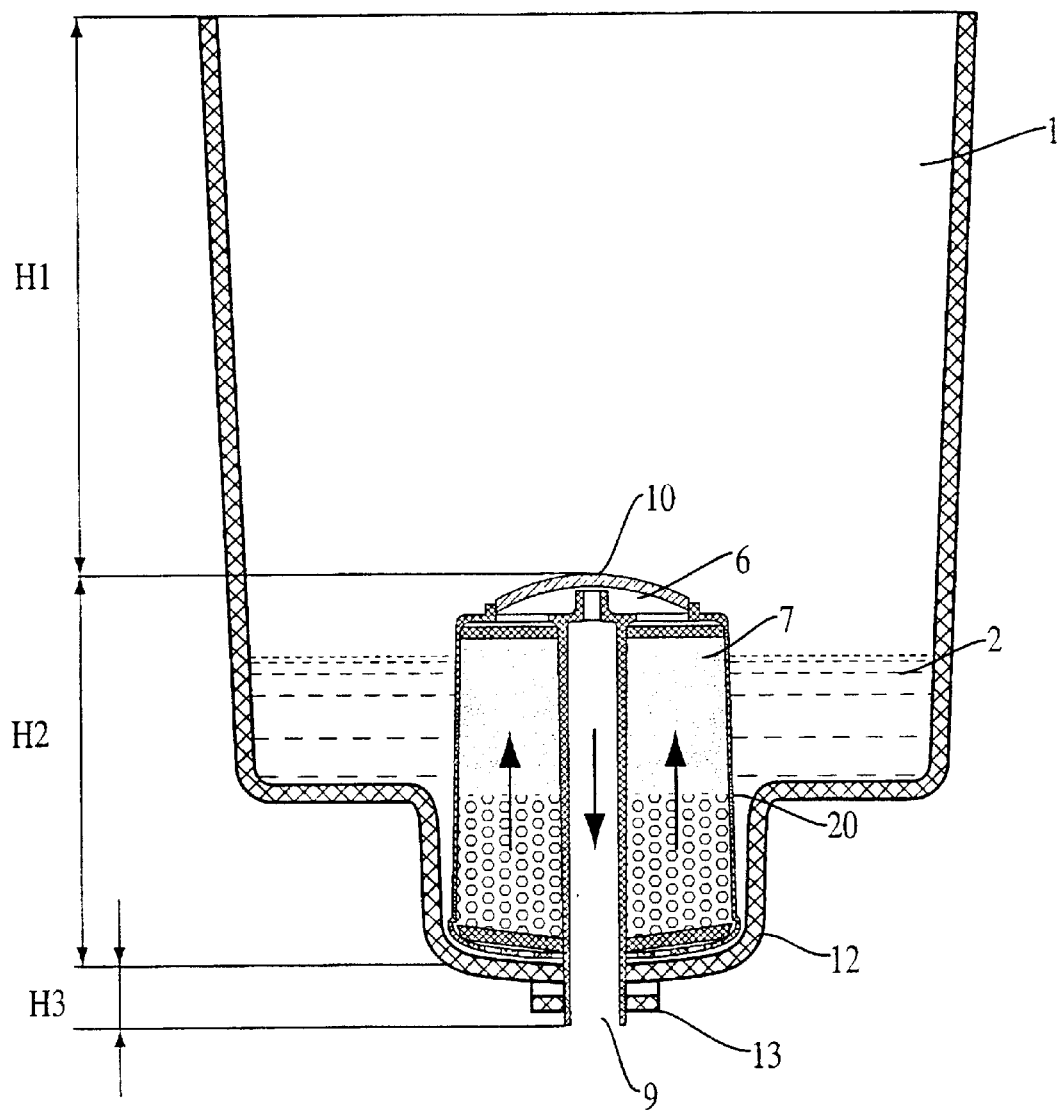
FIGS. 3 and 4 are cross sectional views of embodiments of the filter cartridge, wherein the discharge conduit is located inside the filter cartridge housing, with the cartridge in place in a feed container.
Figure 6:
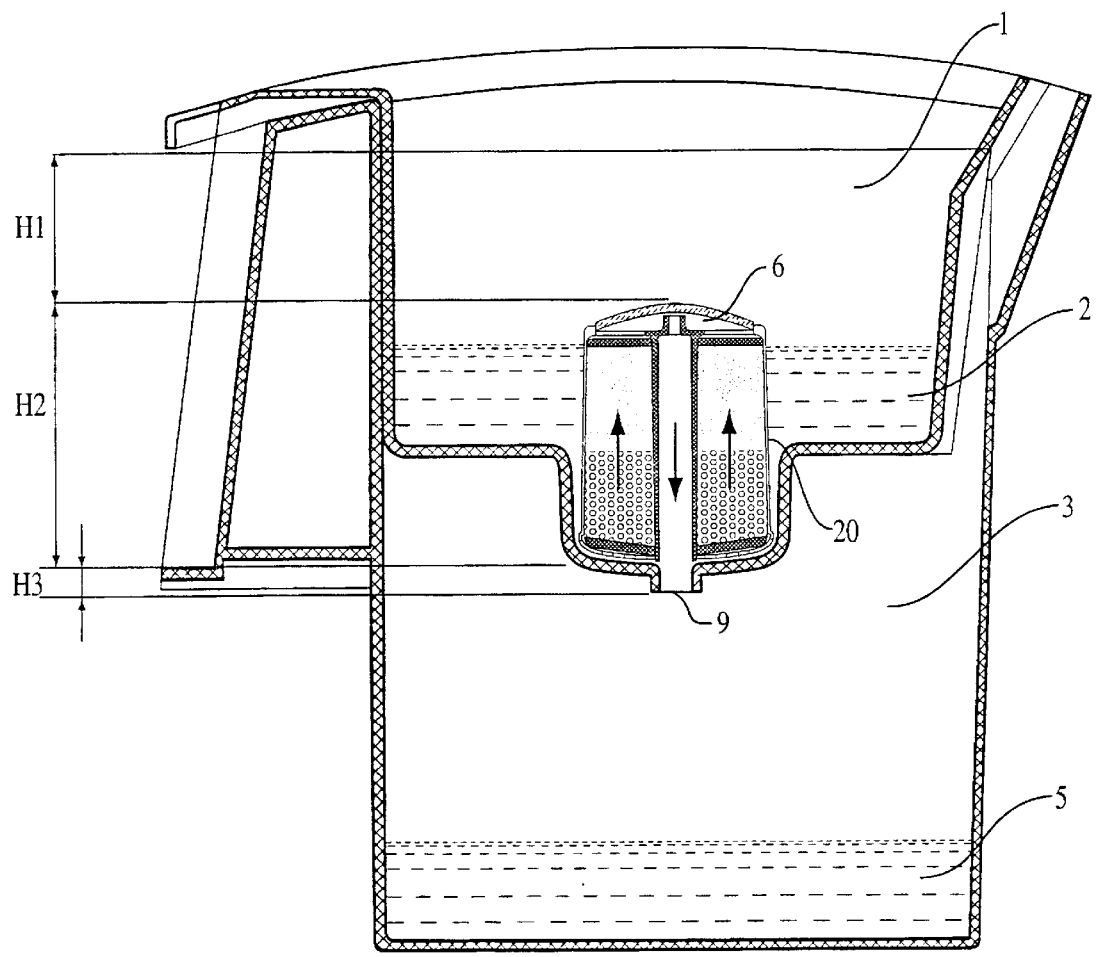
FIGS. 6, 7 and 8 are cross sectional views of the filters of FIGS. 1, 2 and 5, respectively, each shown in a feed container with an additional container for collecting purified liquid in the form of a pitcher.

Referring now to FIGS. 1, 3, and 6 of the drawings, a liquid purification assembly is comprised of container 1 for the liquid 2 that needs to be purified and a filter cartridge 20 placed therein. Filter cartridge 20 preferably comprises a cylindrical or conical housing with means for liquid inflow and outflow. Adsorption-bactericidal filter material 7, desirably based on use of granular activated carbon and/or activated carbon fiber and/or ion-exchange granular or fibrous material is positioned inside the housing of filter cartridge 20. Layers of a permeable, hydrophilic material 11 are additionally placed at the liquid inflow (11a) and outflow (11b) sides inside the housing of the filter cartridge 20. Lower part of the housing of the filter cartridge 20 is made in a convex form with openings 21 therein for flowing liquid into the cartridge. The corresponding lower part of container 1, which holds the liquid that needs to be purified, is concave.

The upper part of the filter cartridge comprises a hermetic cavity 6 for collecting purified liquid 5, which is connected to means removing purified liquid from the filter cartridge 20. Said means for removing liquid from sealed cavity 6 is preferably an elongated tubular conduit 8 that can be located either inside the housing of the filter cartridge 20 (FIGS. 1–4, 6 and 7), or outside of the housing of the filter cartridge 20 (FIGS. 5 and 8) made in a form of a siphoning tube.

The upper part 10 of the siphoning tube 8 extends upwardly into cavity 6, is preferably of reduced cross section, and extends above the top of filter material 7 (FIGS. 1–4). The lower end 9 of the siphoning tube (FIGS. 1–3, 6 and 7) is made to extend below the lowest part of the housing of the filter cartridge.

In order to provide dependable seal in this connection, lower part 9 of the siphoning tube 9, which protrudes outside of the housing of the filter cartridge 20, and/or the opening in the lower part of the container for the liquid which needs to be purified additionally comprise means for hermetically sealing a connection between the lower part of the sealed cavity and the opening in the lower part of the container. Said means may comprise, for example, a gasket 12 and a holding nut 13.

Specific sizes and separate design parameters of the filter cartridge and the whole filter can be selected by the specialists skilled in the art depending on the specific requirements.

In operation, FIGS. 1, 3 and 6 of the drawings show a drinking water purification device wherein impure liquid is passed from a feed container 1 (FIGS. 3 and 6), which contains liquid to be purified, into the lower part of filter cartridge 20 through apertures 21 the bottom thereof, and then upwardly through filtration media 7 within cartridge 20, through opening 22 and into sealed cavity 6 located at the upper part of the filter cartridge 20. The purified liquid fills cavity 6 until the liquid level rises above the top of the upper extension 10 of tubular fluid channel 8. Purified liquid then overflows through channel 8 and is discharged through end 9 thereof into collection vessel 3. Extension 10 will desirably have a reduced cross section.

According to the invention, the purification process will continue until all of the liquid in container 1 has been treated and transferred to container 3. This result is obtained because once flow through conduit 8 begins, the hermetic nature of cavity 6 causes a vacuum to be formed therein. This, in turn, causes a siphoning action to be initiated. Liquid flows from feed container 1, into and through the filter media 7 in cartridge 20, into cavity 6 where it forms a pool. When the surface of the pool rises above the top of extension 10 it overflows into extension 10 and then down though conduit 8. Conduit 8 and its extension 10 will be selected to have horizontal cross sections sufficiently small to permit liquid to pass therethrough without leaving a channel for air to move in the opposite direction. Downward flow through conduit 8 results in formation of a vacuum in cavity 6 whereupon a siphon is established which continues to draw liquid from container 1 even after the liquid level in container 1 falls below the top of filter cartridge 20 (shown in FIG. 6 as the boundary between zones H1 and H2). The flow continues until the vacuum in chamber 6 is broken after container 1 has been emptied.

The filter cartridge 20 is secured in the lower, concave part of container 1, and impure liquid is prevented from leaking from upper container 1 into lower container 14 by use of a sealing gasket 12 and a holding nut 13 (FIG. 3). Holding nut 13 is threaded onto an external thread formed on the lower protruding part 9 of tubular channel 8.

To provide more complete removal of the liquid from container 1, preferably the lower part of the filter cartridge 2 is made in convex form, the corresponding lower part of container 1 is made in concave form, and the two are nested together.

To have the filter cartridge 20 filled with liquid after the end of filtration, a permeable hydrophilic material 11 is placed in the filter cartridge 20 at the liquid inflow side 11b, and/or at the liquid outflow side 11a. The lower end 9 of the fluid channel 8 of the filter cartridge 2 is placed and hermetically sealed in an opening in the lower part of the liquid containing vessel.

The liquid is filtered through the filter cartridge 20, wherein filter material 7 comprises granular activated carbon and/or activated carbon fiber and additionally granular and/or fibrous ion-exchange materials.

In order to provide for air removal from the filter material 7 and to fill the sealed cavity 6 with liquid at the beginning of the filtration process, liquid is filtered through the filter cartridge 20. The surface of the upper layer of the filter material 7 is spaced from the upper end of the filter cartridge to permit any air that is separated from the liquid to exit the cartridge, together with the purified liquid, into cavity 6 and out of the filtration section through channel 8 into lower container 3.

As seen in FIG. 6, H2 is the zone defining the amount of liquid introduction into the filter cartridge 20 required to initiate the filtration process. H1 is zone defining the practical maximum amount of additional water that can be added into the upper container 1. H3 is the distance that the end 9 of tube 8 extends below the bottom of the filter cartridge.

In accordance with the invention, a filter for a liquid purification, particularly for drinking water, comprises a container 1 and filter cartridge 2. Container 1 contains liquid that should be purified. Filter cartridge 2 comprises a housing with the means for inflow of the liquid that must be purified, the means for removing purified liquid and filter material 3 inside said housing. According to the invention, filter cartridge 2 is located inside the container 1, said means for removing purified liquid from filter cartridge 2 comprise a sealed cavity 6. Upper part of the sealed cavity 6 is connected to the hermetic cavity for purified liquid collection 5 in the upper part of the filter cartridge 2, and lower part of the sealed cavity 6 is located below level H2 at which liquid is introduced into the filter cartridge. Thus, an upward flow of liquid through the filter cartridge 2 and removal of the purified liquid due to siphoning effects is provided.

In order to have means for the complete removal of the liquid which is being filtered from the container, the lower part of the filter cartridge is made in the convex form, and the corresponding lower part of the container 1 is made in the concave form, and the means for liquid inflow into the filter cartridge 2 are made in the form of one or more openings in the lower part of the housing of the filter cartridge 2. Permeable hydrophilic material 11a,b is located in the filter cartridge 20 at the liquid inflow side and at the liquid outflow side, proving a possibility of having filter cartridge 2 filled with liquid after the end of the filtration.

Practically any known filtration materials can be used for the filter construction; however, filter materials useful in filter cartridges made in accordance with this invention will desirably comprise an adsorption-bactericidal material based on granular activated carbon and/or activated carbon fiber. It may also comprise an adsorption-bactericidal material based on granular and/or fibrous ion-exchange material. The preferred filter media of the present invention will be an adsorption material of the type disclosed in my copending U.S. application Ser. No. 08/791,859, which comprises a mixture of granules and fibers, and particularly a mixture of granular activated carbon (GAC) and activated carbon fiber (ACF). The term "GAC" as used herein means granular activated carbon in its art recognized sense, i.e., porous carbon particles which range in size from 50 to 3000 microns. Preferably, the granules used when practicing this invention will have diameters from about 100 to 2,000 microns, and most preferably about 200 to 1,000 microns. Granules useful in accordance with this invention will also have a specific surface area of at least 300 $m^2/g$, and more preferably at least 500 $m^2/g$. They will also have an adsorption capacity of methylene blue of at least 50 mg/g, and more preferably at least 100 mg/g. The term "ACF" as used herein means activated carbon fiber in its art recognized sense; that is, porous carbon fibers obtained from organic fibers through a carbonization treatment and an activation treatment. ACF is classified by the starting material used to prepare the same. Common starting materials include rayon, polyacrylonitrile, pitch, and the like.

Figure 2:
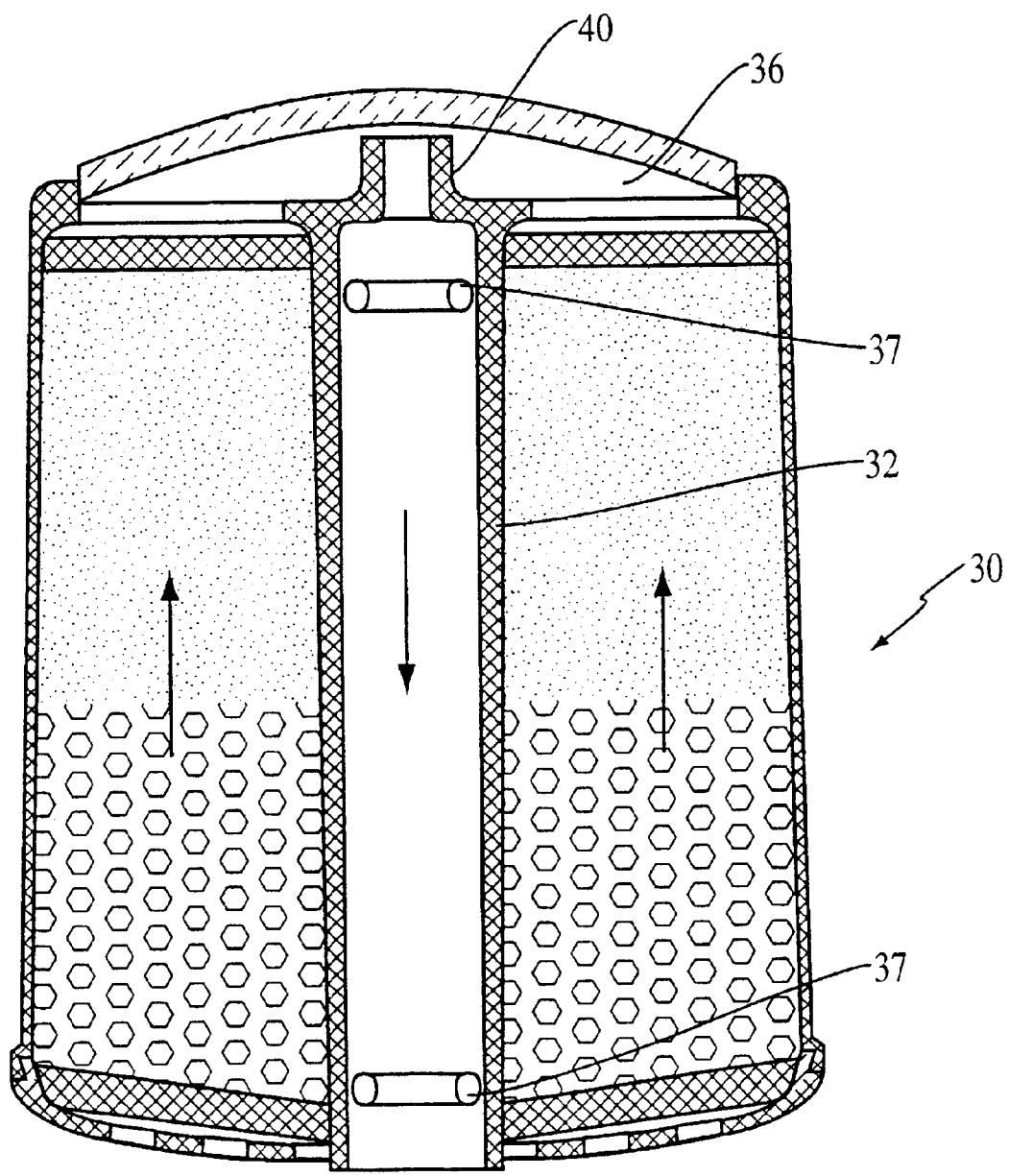
Figure 4:
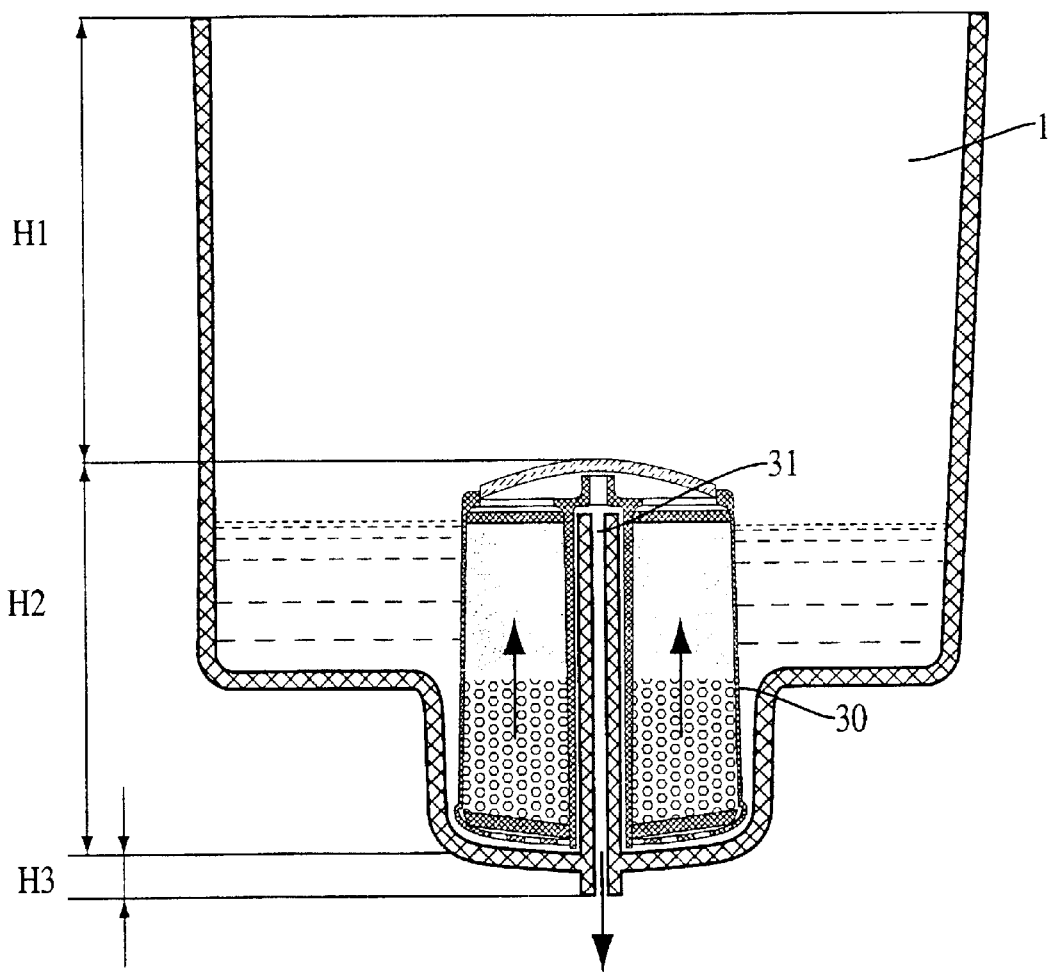
Figure 7:
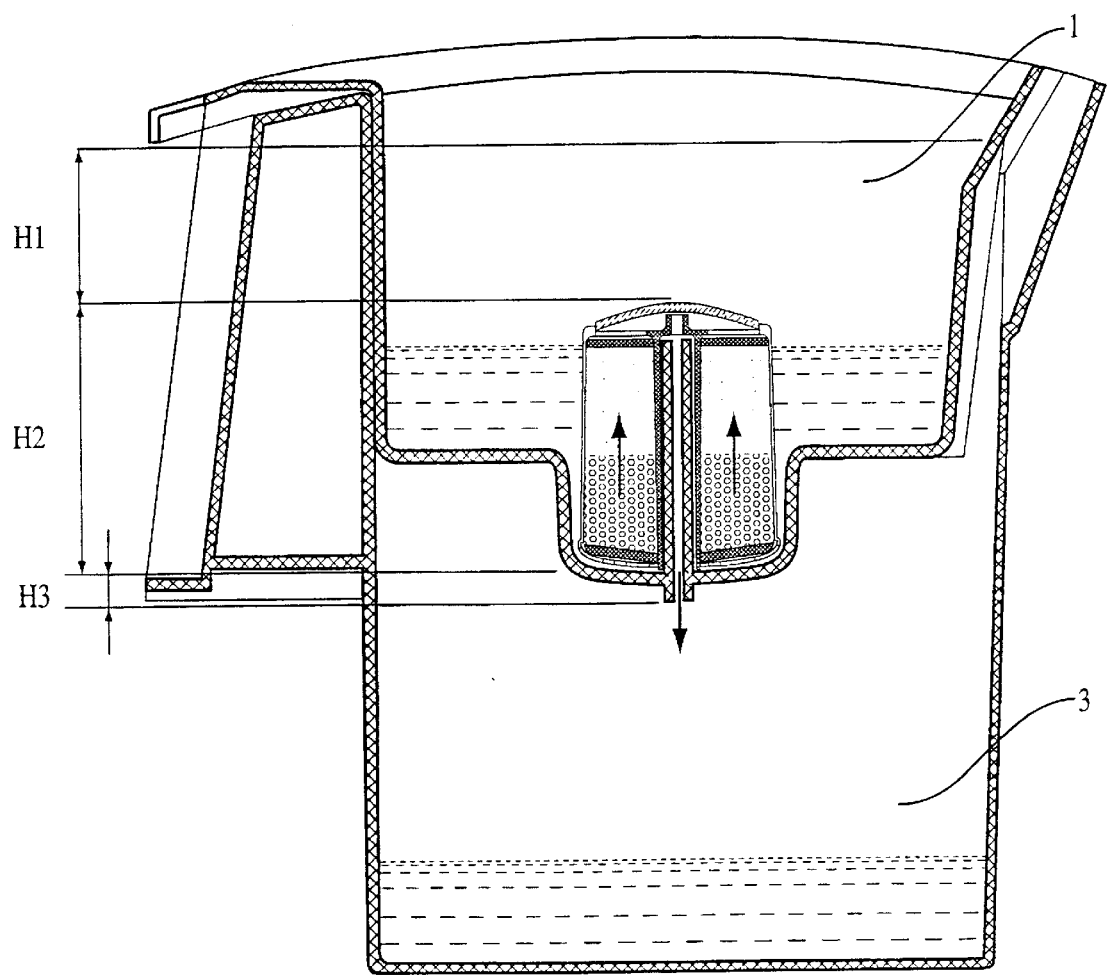

In the embodiment depicted in FIGS. 2, 4 and 7, the filter cartridge 30 has a siphoning tube located inside its housing in the form of a cylindrical cavity 32 which is inserted onto siphon connector 31 which extends upwardly (FIGS. 4 and 7) from the bottom of container 1. O-rings 37 hold the connector in place in cavity 32 and seal the assembly against passage of air. Hollow siphon connector 31 is a tubular member that is secured to and completely seals an opening in the lower concave part of the container 1. The lower end of connector 31 extends below the bottom of container 1 and also protrudes below the housing of the filter cartridge 30. The upper part 40 of the wall of cavity 32 extends to the top of hermetic cavity 36 in the upper part of filter cartridge 30.

The sealed cavity 36 in the filter cartridge 30 can also be made as an additional siphoning connector (FIGS. 2 and 7). Lower part of the additional siphoning connector is secured in the opening in the lower part of container 1, and the upper part is hermetically placed in the connector 32, inside filter cartridge 30. Said connector 32 is used for the outflow of the purified liquid. Wall 40 of the connector 32 protrudes over the surface of the upper layer of the filter material, allowing air and/or gas to be removed from the filter material and allowing sealed cavity 36 to be filled with liquid at the beginning of the filtration.

Figure 5:
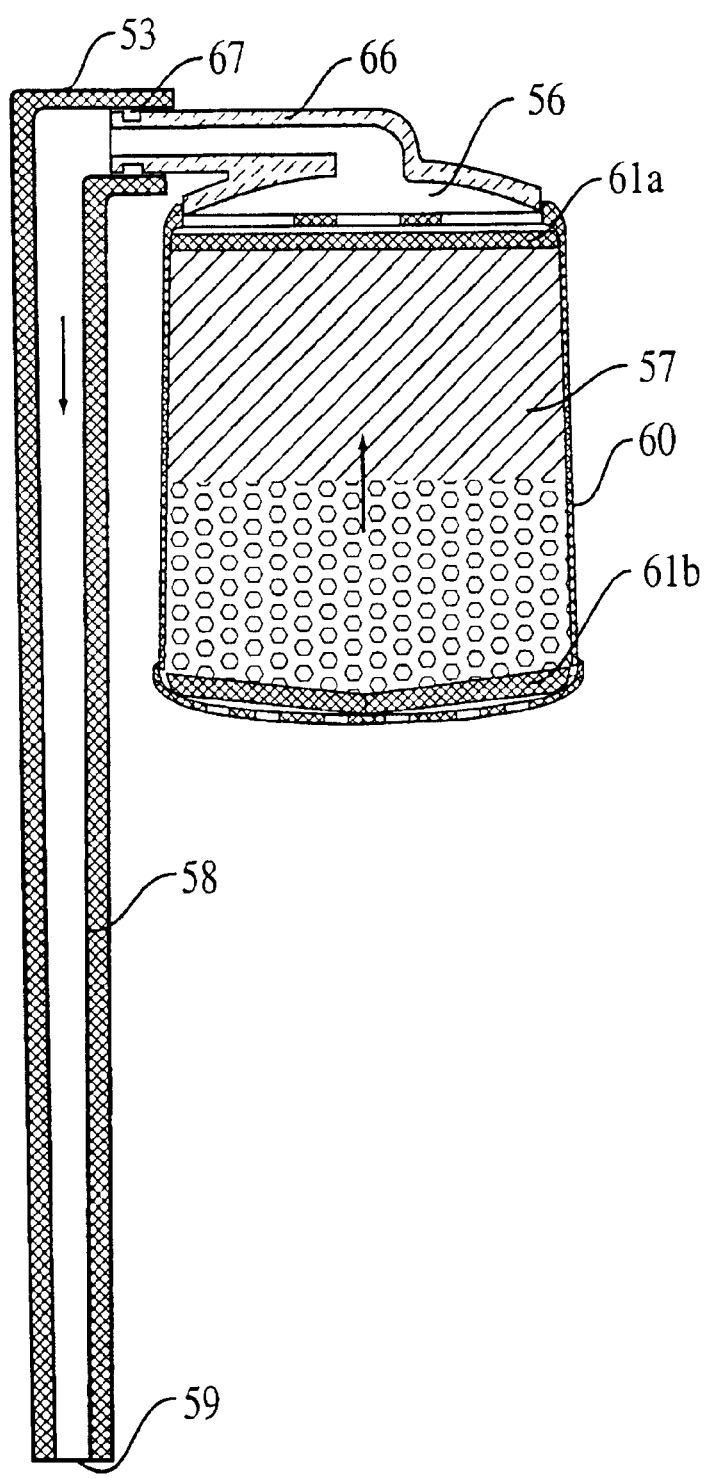
FIG. 5 is a cross sectional view of a filter cartridge with a discharge conduit located outside of the filter cartridge housing.
Figure 8:
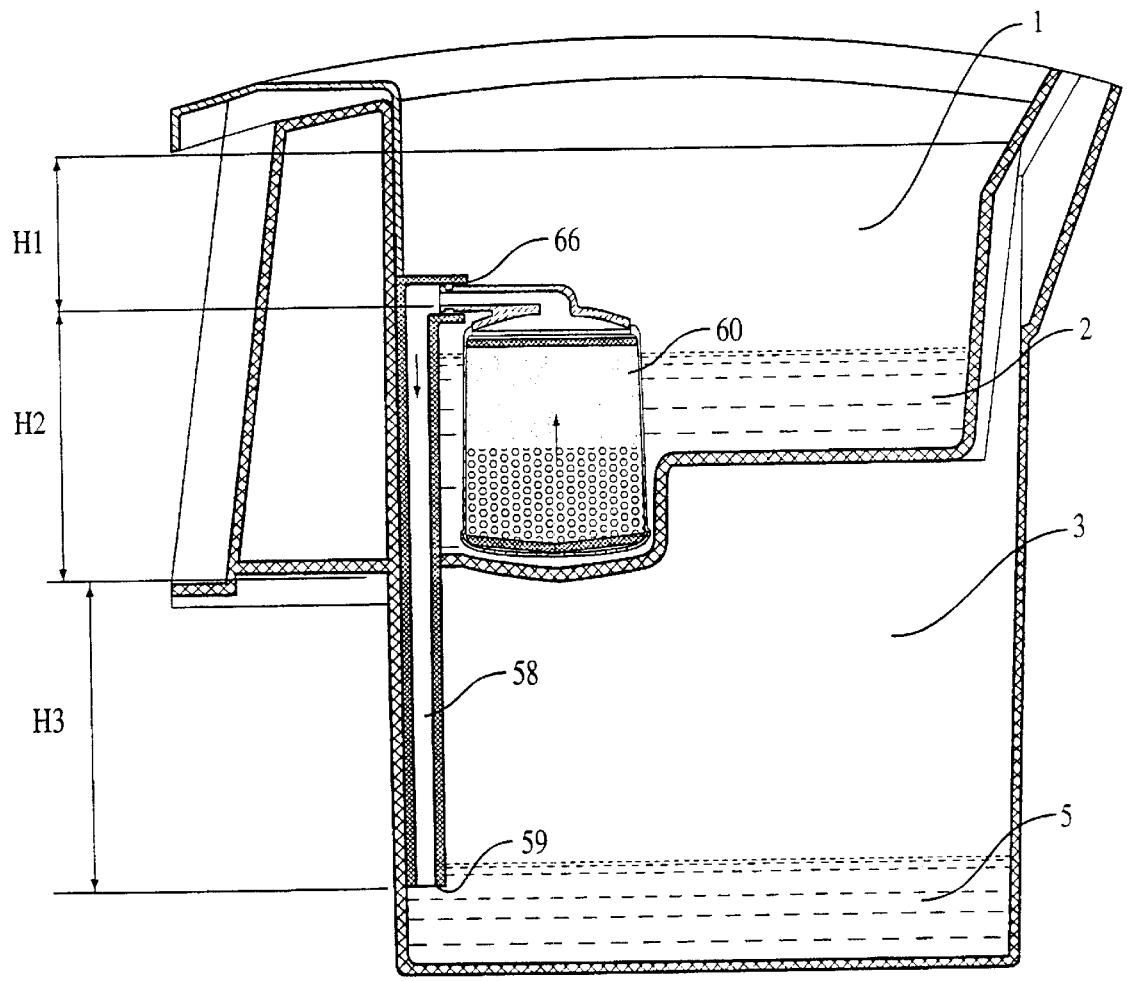

In the embodiment depicted in FIGS. 5 and 8, the siphoning tube 58 is placed outside of the filter cartridge housing 60. Tube 58 can be a separate part or formed as part of either of containers. In this embodiment, the lower end 59 of the siphoning tube 58 is located below the level of the liquid inflow into the lower part of the filter cartridge, and will desirably extend into the pool of purified water 5 that collects in vessel.

As shown in FIGS. 5 and 8, liquid collected in cavity 56 at the upper end of filter cartridge 60 can be removed through a siphoning tube located outside of the filter cartridge. The siphoning tube 58 can comprise an upper horizontally positioned portion 53 adapted to receive the end of tube 66 in sealing relation whereby the upper part of the siphon tube is connected to the hermetic cavity 56 for collecting purified liquid in the upper part of the filter cartridge 60. A good seal may be ensured by the use of an O-ring 67 or similar flexible seal material. Lower end 59 of the siphon tube extends below level H2 (FIG. 8), whereby continued liquid flow into the filter cartridge 60 is achieved.

To provide for air and/or gas removal from filter material 57 and to fill the sealed cavity 56 with liquid at the beginning of the filtration process, the upper end of the tube 58 is connected to the hermetic cavity 56 for purified liquid 5. The cavity 56 has walls that extend above the surface of the upper layer of the filter material 57. The lower part of the tube 58 extends below the housing of the filter cartridge, and it is placed hermetically into an opening in the lower part of the container 1 for the liquid which needs to be purified, providing means to remove purified liquid from the filter cartridge with the siphoning outlet through the opening in the lower part of the container 1. In a preferred embodiment, the lower end 59 of tube 58 extends into the collecting pool of purified water in container 3.

The combination of this invention also comprises a container for the purified liquid 5 made in a form of a pitcher, and a vessel 1 for liquid 2 that needs to be purified is made in a form of an insert that is placed in the upper part of the pitcher. In this case the container for the purified liquid 5 and/or vessel for the unpurified liquid 2 and/or walls of the hermetic cavity for purified liquid 5 in the upper part of the filter cartridge can be made from transparent material.

In this invention a siphon is used to perform a new, previously unknown function, which is to provide liquid filtration in a filter in the upward direction with liquid flowing by itself, thereby preventing channeling and improving the effectiveness of the procedure. Thus, use of the siphoning effect in this manner allows one to achieve a new, previously unknown technical result.

As it will be shown in the examples below, these inventions allow not only to provide liquid filtration in the filter in the upward direction with liquid flowing by itself, and where the level of the outflow of the purified liquid from filter may be higher than the level H2 of the inflow of liquid in the filter, but, as compared to the known designs, allow to increase significantly quality of the filtration due to the automatic air and/or gas removal from the filtration material, keeping the filter filled with liquid after the end of filtration, reducing filtration resistance and increasing purification abilities of the filter. At the same time, the filter design is made simpler and cheaper to make.

EXAMPLES

In operation, the filter functions and the method of this invention are described in the following manner with reference to the embodiment shown in FIGS. 1, 3, and 6:

To begin the filtration cycle the container 1 is filled with liquid in such a way that the level of liquid that needs to be purified is higher than the highest upper point of the filter cartridge housing. The filtration process starts by itself after the filter cartridge 20 becomes filled with liquid, air is replaced from the filter material 7, and the sealed cavity 6 for collecting purified liquid in the upper part of the filter cartridge 20 is filled with liquid. Liquid is being filtered as it flows by itself upward through the filter cartridge and it is removed through the cavity 6 and channel 8 into vessel 14 for collecting purified liquid 5. At the end all liquid has been siphoned out from the container 1, and filtered through the filter cartridge 2, flowing by itself in an upward direction.

In order to filter another portion of liquid, container 1 is again filled with liquid, or an additional volume of liquid is poured into the container 1 during the original filtration process. The filter material remains filled with liquid and it does not dry out during the time intervals between the filtration cycles.

Comparison tests are performed between filters with the identical adsorption capacities, but in the first case (as suggested by the present invention) in the upward flow direction, and in the second case (as suggested by the prior art) in the downward flow direction. It is done in order to confirm effectiveness of the invention by comparing results of purifying different solutions through the filters. Conditions and results of the experimental investigation of the effectiveness of the invention and also experimental proof that it is possible to obtain a new technical result are shown in Examples 1, 2, 3 and 4 and Tables 1 and 2.

Example 1

There are compared two water filters with the identical interval volumes. Each filter contains 90 ml of the adsorbing carbon material. This adsorbing carbon material comprises AQUALEN activated carbon fiber (manufactured by Aquaphor Corporation, St. Petersburg, Russia) and granular activated carbon G55C-8 (manufactured by PICA Corp., USA) in a weight by weight ratio of 1:7 (4.8 g of Aqualen, dry weight, and 33 g of granular carbon). In one of the filters the water flows downwardly (as in the prior art) and in the second filter water flows in an upward direction according to the present invention. The time to flow 1 liter of liquid is 15 minutes. Phenol solution with a concentration of 10 mg/L was used as the test solution. The comparison results are shown in Table No. 1.

Example 2

The experimental conditions are the same as in Example 1 except that a solution containing *E. Coli* index 100 (100 *E. Coli* bacteria per 1 liter) was used. Results of the experiment are shown in Table No. 1.

Example 3

The experimental conditions are the same as in Example 1 except that a cation-exchange resin SR-10 (manufactured by SYBRON Corp., USA) in the amount of 90 grams was used. The time for flowing 1 liter of liquid was 4 minutes 3 seconds. Copper solution (10 mg/g) is used as a model Solution. Experimental results are shown in Table No. 1.

TABLE 1

| Example No. | Liquid Flow Upward % purification | Liquid Flow Downward % purification |
| --- | --- | --- |
| 1 | 99.5 | 85 |
| 2 | >99 | 80 |
| 3 | 97 | 88 |

Example 4

The experimental conditions are the same as in Example 1. Purification abilities of the replaceable filter cartridge are investigated wherein the cartridge is manufactured according to the present invention and the filtration takes place in the upward flow direction. Filter cartridge contains 90 grams of a mixture of activated carbon fiber (AQUALEN) with a cation-exchange resin (SYBRON SR-10) in a volumetric ratio of 1:2. The time to filter one liter of model solution was 8 minutes.

TABLE 2

|  | Model Solution Characteristics | % Degree of Purification |
|---|---|---|
| Phenol | 10 mg/L | 98 |
| Calcium | 10 meq/L (500 mg/L CaCO$_3$) | >99 |
| Copper | 1 g/L | 89 |

The practical examples above demonstrate that it is possible to achieve a new technical result using the invention described herein. They also confirm a possibility of commercial application and prove effectiveness of the inventions as compared to the known constructions.

Various embodiments have been specifically described, and others are contemplated as being within the scope of the invention. In particular, the use of modified activated carbon such as those described in U.S. Pat. No. 5,705,269 are considered to be uniquely useful in conjunction with the device described herein. That patent describes a modified activated carbon material for removing bacteria from a liquid, comprising activated carbon fiber having an organic bactericidal compound selected from the group consisting of brilliant green, rivanol, benzyl alcohol and zephiran containing active bactericidal groups physically adsorbed thereon, said modified carbon material being capable of binding undesirable bacteria and thus removing same from said liquid. The activated carbon advantageously comprises a carbon fiber 2–10 microns in diameter having adsorbed thereon 10–30 milligrams of brilliant green.

While the device of this invention has been described particularly with respect to the purificatiQn of drinking water, it is also useful for purifying other liquids used at home, and in the other fields, such as chemical, medical and other industries.

What is claimed is:

1. In combination, a) a filter cartridge for liquid purification comprising a housing having a top, a bottom, and a side wall, and having a filtration chamber therein characterized in that it has a sealed cavity in tile upper portion thereof; a liquid inlet in said housing to permit liquid to flow from an unpressurized source of liquid to be purified into the filter cartridge; means for providing a vacuum in the sealed cavity comprising a tubular element having an inlet in the sealed cavity and extending from the sealed cavity to a point below the bottom of the filter cartridge housing, purified liquid being removed from the filter cartridge through said tubular element; a path for the flow of liquid within said filter cartridge, said path proceeding from said liquid inlet in the housing, upwardly through said filtration chamber, into said sealed cavity, and out of said filter cartridge through said tubular element; and further including filter media positioned within said filtration chamber; and b) a container for liquid to be purified, said container having upper and lower sections, said upper section having sides and a bottom; wherein the filter cartridge is positioned inside and at the bottom of the upper section and receives liquid to be purified from said container; and wherein said tubular element for removing purified liquid from the filter cartridge tends from the top of the sealed cavity to below both the liquid inlet in the housing and the bottom of said upper section of the container; and wherein the bottom of the filter cartridge has a convex form and the corresponding lower part of the upper section of the liquid container has a concave form, the liquid inlet is at the bottom of the housing, and the filter cartridge is stated in the concavity in the bottom wall of the upper section of the liquid container, whereby substantially complete removal of liquid from the upper section of the container can be achieved.

2. In combination, a) a filter cartridge for liquid purification comprising a housing having a filtration chamber therein with filter media positioned within said filtration chamber; characterized in that the flow of liquid through the filter cartridge is effected by a siphon; said siphon comprising a liquid inlet to said filter cartridge at the bottom of its housing, said liquid inlet being adapted to receive liquid, a cavity in the upper portion of the cartridge; wherein liquid passing into the filter cartridge moves upwardly through the filtration chamber and into said cavity, and an outlet from said filter cartridge comprising an elongated and open ended fluid conduit of restricted cross sectional area which extends from a locus adjacent the top of said cavity to a locus below the liquid inlet in the bottom of the filter cartridge; whereby, once primed, said siphon causes liquid to be drawn through the filter cartridge, and b) a container for liquid to be treated; said filter cartridge being removably positioned inside the container at its bottom, with said liquid inlet being adapted to receive liquid from the lower portion of the containers, and wherein restricted, elongated fluid conduit extends through the bottom of the container, with the open end thereof being positioned below the bottom of the container.

3. The combination of claim 2 wherein the restricted, elongated fluid conduit for removing purified liquid from the filter cartridge is comprised of two parts, a first section which is integral with the filter cartridge and a second section which is integral with the container, and wherein said sections are mated in sealing relation.

4. The combination of claim 2, and further comprising a second container positioned to receive purified liquid from the open end of the elongated fluid conduit.

5. The combination of claim 4, wherein the second container for purified liquid is formed in the shape of a pitcher, and the container for liquid to be treated is inserted into an upper part of the pitcher.

* * * * *